(12) United States Patent
Yeager et al.

(10) Patent No.: US 9,506,382 B2
(45) Date of Patent: Nov. 29, 2016

(54) VARIABLE VALVE ACTUATOR

(71) Applicant: Caterpillar Inc., Peoria, IL (US)

(72) Inventors: Kendall Yeager, Peoria, IL (US);
Victor Yacoub, Washington, IL (US);
Kevin Schreader, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 64 days.

(21) Appl. No.: 14/672,916

(22) Filed: Mar. 30, 2015

(65) Prior Publication Data
US 2016/0290184 A1   Oct. 6, 2016

(51) Int. Cl.
| F01L 1/34 | (2006.01) |
| F01L 13/00 | (2006.01) |
| F16K 31/122 | (2006.01) |
| F16K 31/524 | (2006.01) |

(52) U.S. Cl.
CPC ........ F01L 13/0021 (2013.01); F01L 13/0005 (2013.01); F16K 31/122 (2013.01); F16K 31/52408 (2013.01)

(58) Field of Classification Search
CPC ............ F01L 13/0021; F01L 13/0005; F16K 31/122; F16K 31/52408
USPC ...................................... 123/90.16
See application file for complete search history.

(56) References Cited

U.S. PATENT DOCUMENTS

| 6,237,551 B1 | 5/2001 | Macor et al. |
| 7,004,122 B2 | 2/2006 | Cornell et al. |
| 7,258,088 B2 | 8/2007 | Cornell et al. |
| 8,091,522 B2 | 1/2012 | Minato et al. |
| 8,375,904 B2 | 2/2013 | Gustafson |
| 2010/0186696 A1* | 7/2010 | Keller ................ F01L 13/0015 123/90.16 |
| 2011/0214631 A1 | 9/2011 | Sato et al. |

FOREIGN PATENT DOCUMENTS

| DE | 10359087 B3 | 5/2005 |
| JP | 5923020 A | 2/1984 |
| WO | 2014/106681 A1 | 7/2014 |

* cited by examiner

*Primary Examiner* — Zelalem Eshete
(74) *Attorney, Agent, or Firm* — Baker & Hostetler LLP

(57) ABSTRACT

A valve actuation system is provided. A fluid actuator is configured to selectively prevent a valve from moving to a particular position. A source of fluid is in fluid communication with the fluid actuator. A bi-directional control valve is configured to control a flow of fluid between the source of fluid and the fluid actuator. A fluid passageway connects the bi-directional control valve with the fluid actuator. A relief valve is in fluid communication with the fluid passageway and moveable between a closed position to prevent a flow of fluid therethrough to create a high pressure circuit in the valve actuation system and an open position to allow a flow of fluid therethrough to create a low pressure circuit in the valve actuation system.

20 Claims, 7 Drawing Sheets

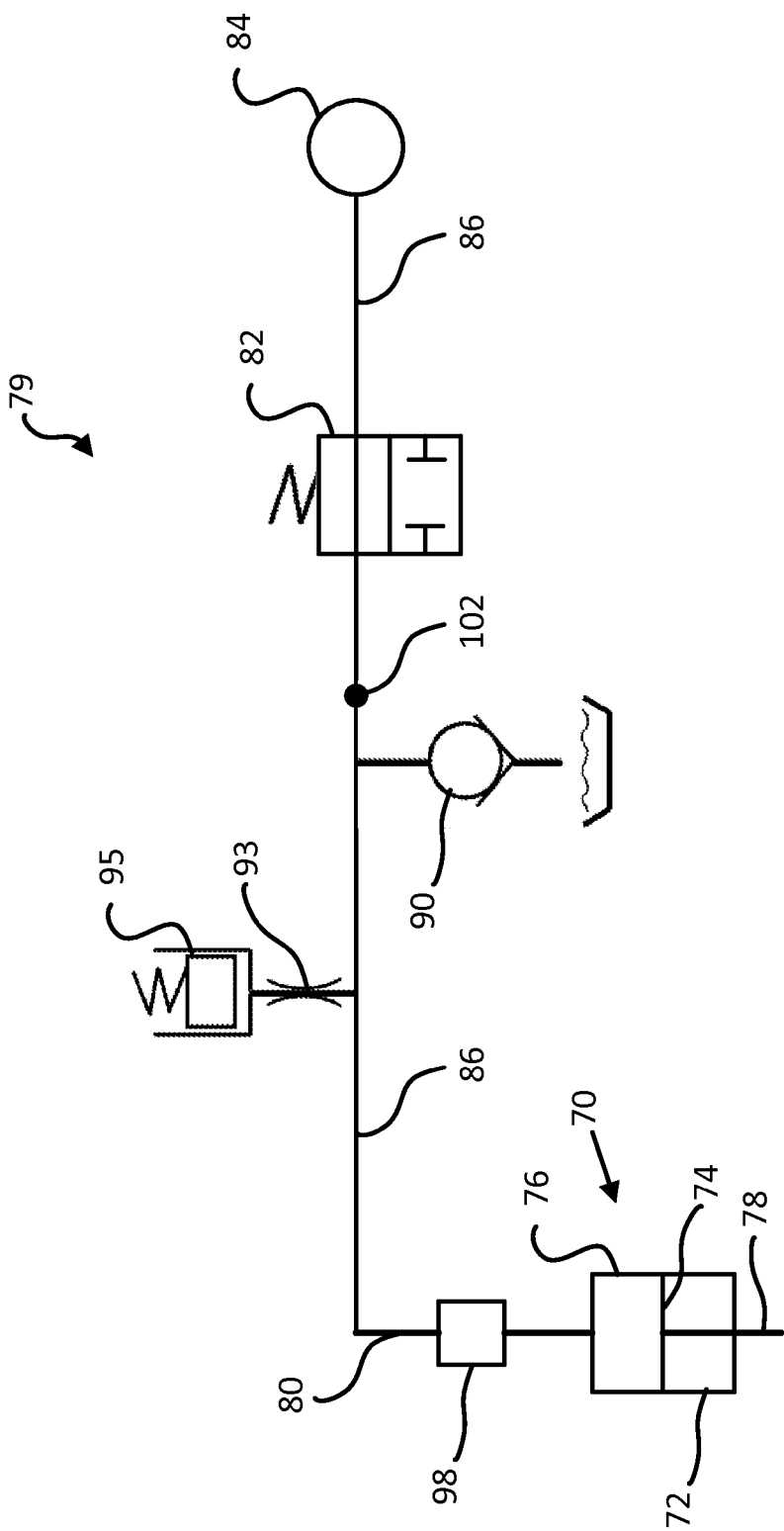

VARIABLE VALVE ACTUATOR

TECHNICAL FIELD

This disclosure relates generally to a valve actuation system, more particularly, to a valve actuation system associated with an internal combustion engine.

BACKGROUND

The operation of an internal combustion engine, such as, for example, a diesel, gasoline, or natural gas engine, may cause the generation of undesirable emissions. These emissions, which may include particulates and nitrous oxide (NOx), are generated when fuel is combusted in a combustion chamber of the engine. An exhaust stroke of an engine piston forces exhaust gas, which may include these emissions from the engine. If no emission reduction measures are in place, these emissions will be exhausted to the environment.

Research is currently being directed towards decreasing the amount of certain emissions that are exhausted to the environment during the operation of an engine. It is expected that improved engine design and improved control over engine operation may lead to a reduction in the generation of these emissions. Many different approaches, such as, for example, engine gas recirculation and aftertreatments, have been found to reduce the amount of emissions generated during the operation of an engine. Unfortunately, the implementation of these emission reduction approaches typically results in a decrease in the overall efficiency of the engine.

Additional efforts are being focused on improving engine efficiency to compensate for the efficiency loss due to the emission reduction systems. One such approach to improving the engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation. As described in U.S. Pat. No. 6,237,551 to Macor et al., issued on May 29, 2001, a "late intake" Miller cycle may be implemented in such a cam arrangement by modifying the shape of the cam to overlap the actuation of the intake valve with the start of the compression stroke of the piston.

However, a late intake Miller cycle may be undesirable under certain operating conditions. For example, a diesel engine operating on a late intake Miller cycle will be difficult to start when the engine is cold. This difficulty arises because diesel fuel combustion is achieved when an air and fuel mixture is pressurized to a certain level. Implementation of the late intake Miller cycle reduces the amount of air and the amount of compression within each combustion chamber. The reduced compression results in reduced pressure, which in turn results in reduced temperature of the engine and in a lower maximum pressure level of the air and fuel mixture. Thus, achieving combustion in a cold engine operating on a late intake Miller cycle may prove difficult.

As noted above, the actuation timing of a valve system driven by a cam arrangement is determined by the shape of the driving cam. Because the shape of the cam is fixed, this arrangement is inflexible and may not be changed during the operation of the engine. In other words, a conventional cam driven valve actuation system may not be modified to account for different operating conditions of the engine.

As a further example, U.S. Pat. Nos. 7,004,122 and 7,258,088 describe an intake valve actuation system including a control valve for managing a flow of fluid to a fluid actuator. In addition to the control valve, U.S. Pat. Nos. 7,004,122 and 7,258,088 describe a configuration of parallel fluid passages between the control valve and the fluid actuator. In particular, a directional control valve and a check valve are configured along respective fluid passages of the parallel fluid passages to effect further fluid control to and from the fluid actuator. However, improvements in valve actuation systems are needed, for example, to lower the compression ratio and peak cylinder pressures in a large dual fuel diesel and natural gas engine to allow for maximum gas substitution while being emissions compliant. Accordingly, these and other shortcomings of the prior art are addressed by the present disclosure.

SUMMARY

In one aspect, the disclosure describes a valve actuation system including a valve moveable between a first position to prevent a flow of fluid and a second position to allow a flow of fluid, a cam assembly configured to move the valve between the first position and the second position, wherein the cam assembly is mechanically connected to the valve, and a fluid actuator configured to selectively prevent the valve from moving to the first position, and further configured to selectively hold the valve at a position between the first position and the second position. A source of fluid may be in fluid communication with the fluid actuator. A bi-directional control valve may be configured to control a flow of fluid between the source of fluid and the fluid actuator. A fluid passageway may connect the bi-directional control valve with the fluid actuator. An accumulator may be in fluid communication with the fluid passageway and a restrictive orifice may be disposed between the accumulator and the fluid passageway to restrict a flow of fluid between the accumulator and the fluid passageway. A relief valve may be in fluid communication with the fluid passageway and moveable between a closed position to prevent a flow of fluid therethrough to create a high pressure circuit in the valve actuation system and an open position to allow a flow of fluid therethrough to create a low pressure circuit in the valve actuation system, wherein the relief valve is actuated between the closed position and the open position based at least on a pressure in the fluid passageway, wherein the high pressure circuit allows the fluid to pass through the fluid passageway to actuate the fluid actuator, and wherein the low pressure circuit allows at least a portion of the fluid in the fluid passageway to drain from the fluid passageway to an external environment.

In another aspect, the disclosure describes a method of controlling an engine having a piston moveable through an intake stroke followed by a compression stroke. The method may comprises rotating a cam to move an intake valve between a first position to prevent a flow of fluid and a second position to allow a flow of fluid during the intake stroke of the piston, wherein the cam is mechanically connected to the intake valve, directing fluid through a bi-directional control valve and a fluid passageway to a fluid actuator associated with the intake valve after the intake valve is moved from the first position, wherein the fluid actuator is configured to selectively hold the intake valve at a position between the first position and the second position; actuating the bi-directional control valve to selectively prevent fluid from flowing through the fluid passageway from the fluid actuator to thereby prevent the intake valve from moving to the first position, and allowing a pressure in the fluid passageway to fall below a threshold pressure to allow a relief valve disposed in fluid communication with the fluid passageway to open and at least a portion of the fluid within the fluid passageway to drain to an external environment.

In yet another aspect, the disclosure describes an engine including an engine block defining at least one cylinder and a cylinder head having at least one intake passageway leading to the at least one cylinder, at least one intake valve moveable between a first position to prevent a flow of fluid through the at least one intake passageway and a second position to allow a flow of fluid through the at least one intake passageway, a cam assembly connected to the intake valve to move the intake valve between the first position and the second position, wherein the cam assembly is mechanically connected to the intake valve, a fluid actuator configured to selectively prevent the intake valve from moving to the first position, and further configured to selectively hold the intake valve at a position between the first position and the second position, a source of fluid in fluid communication with the fluid actuator, a bi-directional control valve configured to control a flow of fluid between the source of fluid and the fluid actuator, a fluid passageway connecting the directional control valve with the fluid actuator, an accumulator in fluid communication with the fluid passageway, a restrictive orifice disposed between the accumulator and the fluid passageway to restrict a flow of fluid between the accumulator and the fluid passageway, a relief valve in fluid communication with the fluid passageway and moveable between a closed position to prevent a flow of fluid therethrough and an open position to allow a flow of fluid therethrough, wherein the relief valve is actuated between the closed position and the open position based at least on a pressure in the fluid passageway, wherein the closed position of the relief valve allows the fluid to pass through the fluid passageway to actuate the fluid actuator, and wherein the open position of the relief valve allows at least a portion of the fluid in the fluid passageway to drain from the fluid passageway to an external environment.

BRIEF DESCRIPTION OF THE DRAWINGS

FIG. 3 is a schematic and diagrammatic representation of a fluid supply system for a fluid actuator in accordance with aspects of the disclosure.

DETAILED DESCRIPTION

In an aspect, a variable valve actuator is configured to hold a valve (e.g., cylinder intake valve, brake system valve, etc.) open beyond the normal timing that a valve cam is designed to provide. As an example, the variable valve actuator of the present disclosure includes a piston, accumulator, two-way normally open control valve, and a low pressure relief valve. In certain aspects, engine oil may enter the actuator, passes through the control valve, and extends the piston, while the engine valves are actuated. The control valve may be closed, thus hydraulically locking the piston in the extended position. The hydraulically locked piston holds the engine valves open until the control valve is opened and the oil pressure is released. The piston retracts, while closing the engine valves. In order to control seating velocities, the oil leaving the piston is restricted through a small orifice just before the seating event. The low pressure relief valve opens once the pressure reaches below a certain crack pressure and recloses once the pressure rises above the crack pressure. The low pressure relief valve remains closed while the engine is operating and only opens when the engine is deactivated to drain any oil left over in the actuator. For illustration, the variable valve actuator is described in conjunction with an engine and configured to control an intake valve of the engine. However, other valves and systems may use the variable valve actuator in a similar manner as described herein.

Figure 1:
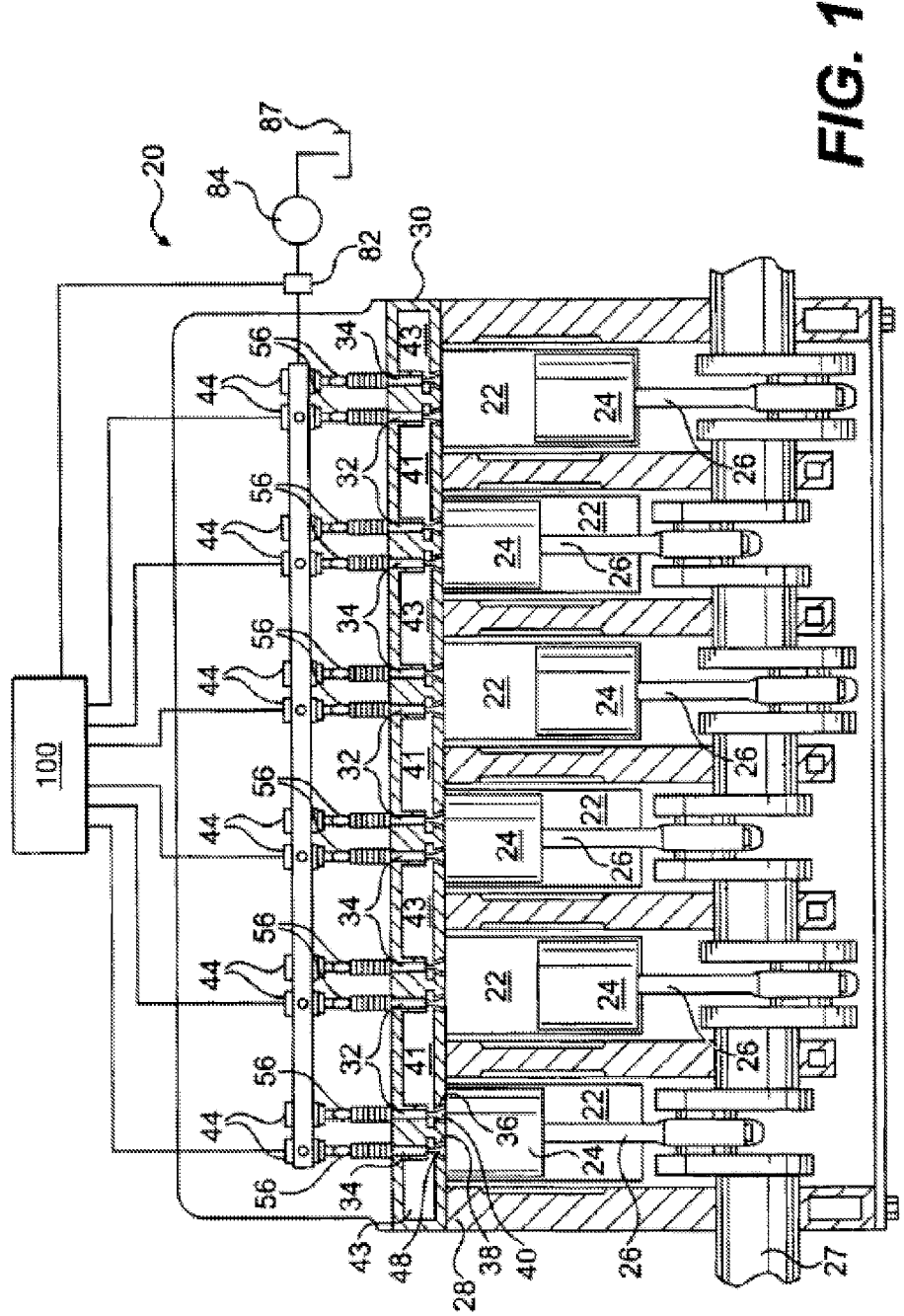
FIG. 1 is a diagrammatic cross-sectional view of an internal combustion engine in accordance with aspects of the disclosure.

Referring to the figures, an exemplary aspect of an engine 20 (e.g., internal combustion engine) is illustrated in FIG. 1. For the purposes of the present disclosure, the engine 20 is depicted and described as a four stroke diesel engine. One skilled in the art will recognize, however, that the engine 20 may be any other type of internal combustion engine, such as, for example, a gasoline, a multi-fuel, or natural gas engine.

As illustrated in FIG. 1, the engine 20 may include an engine block 28 that defines a plurality of cylinders 22. A piston 24 may be slidably disposed within each of the cylinders 22. In the illustrated aspect, the engine 20 includes six cylinders 22 and six associated pistons 24. One skilled in the art will readily recognize that the engine 20 may include a greater or lesser number of the pistons 24 and cylinders 22. Moreover, the pistons 24 and cylinders 22 may be disposed in an "in-line" configuration, a "V" configuration, or any other conventional configuration.

As also shown in FIG. 1, the engine 20 may include a crankshaft 27 that is rotatably disposed within the engine block 28. A connecting rod 26 may be configured to connect each of the pistons 24 to the crankshaft 27. Each of the pistons 24 may be coupled to the crankshaft 27 so that a sliding motion of the piston 24 within the respective cylinder 22 results in a rotation of the crankshaft 27. Similarly, a rotation of the crankshaft 27 will result in a sliding motion of the piston 24.

The engine 20 may also include a cylinder head 30. The cylinder head 30 may define an intake passageway 41 that leads to at least one intake port 36 for each of the cylinders 22. The cylinder head 30 may further define two or more intake ports 36 for each of the cylinders 22.

An intake valve 32 may be disposed within each of the intake ports 36. The intake valves 32 may include a valve element 40 that is configured to selectively block the respective intake port 36. The intake valves 32 may be moveable between a first position to prevent a flow of fluid and a second position to allow a flow of fluid. As described in greater detail below, each of the intake valves 32 may be actuated to move or "lift" the respective valve element 40 to thereby open the respective intake port 36. As an example, in one of the cylinders 22 having a pair of the intake ports 36 and a pair of the intake valves 32, the pair of the intake valves 32 may be actuated by a single valve actuation assembly or by a pair of valve actuation assemblies.

The cylinder head 30 may also define at least one exhaust port 38 for each of the cylinders 22. Each of the exhaust ports 38 may lead from the respective cylinder 22 to an exhaust passageway 43. The cylinder head 30 may further define two or more of the exhaust ports 38 for each of the cylinders 22.

An exhaust valve 34 may be disposed within each of the exhaust ports 38. The exhaust valves 34 may include a valve element 48 that is configured to selectively block the respective exhaust port 38. As described in greater detail below, each of the exhaust valves 34 may be actuated to move or "lift" the respective valve element 48 to thereby open the respective exhaust port 38. As an example, in one of the cylinders 22 having a pair of the exhaust ports 38 and a pair of the exhaust valves 34, the pair of the exhaust valves 34 may be actuated by a single valve actuation assembly or by a pair of valve actuation assemblies.

Figure 2:
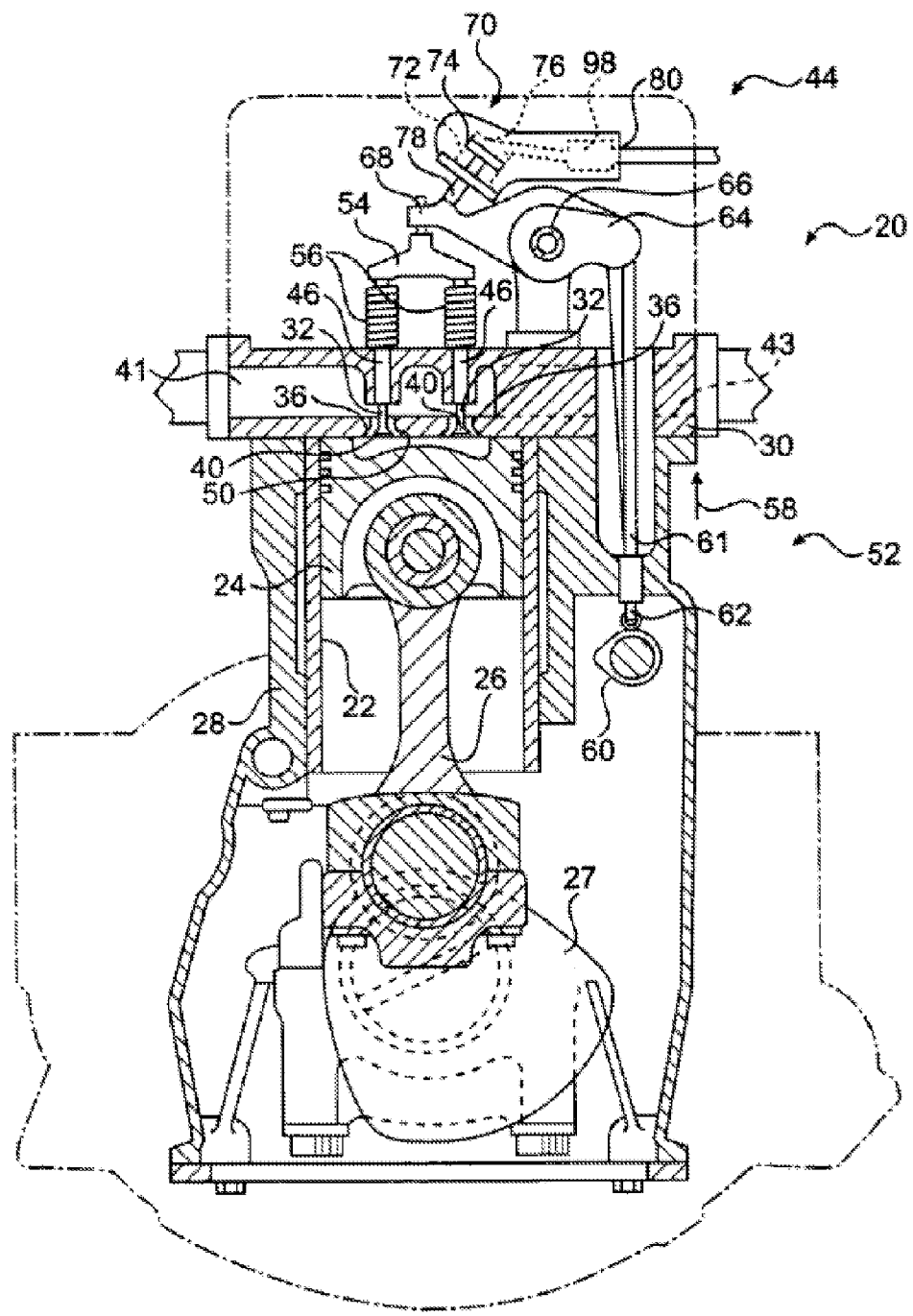
FIG. 2 is a diagrammatic cross-sectional view of a cylinder and valve actuation assembly in accordance with aspects of the disclosure.

FIG. 2 illustrates an exemplary aspect of one of the cylinders 22 of the engine 20. As shown, the cylinder head 30 defines a pair of the intake ports 36 connecting the intake passageway 41 to the cylinder 22. Each of the intake ports 36 includes a valve seat 50. One of the intake valves 32 is disposed within each of the intake ports 36. The valve element 40 of the intake valve 32 is configured to engage the valve seat 50. When the intake valve 32 is in a closed position, the valve element 40 engages the valve seat 50 to close the intake port 36 and block fluid flow relative to the cylinder 22. When the intake valve 32 is lifted from the closed position, the intake valve 32 allows a flow of fluid relative to the cylinder 22.

Similarly, the cylinder head 30 may define two or more of the exhaust ports 38 (only one of which is illustrated in FIG. 1) that connect the cylinder 22 with the exhaust passageway 43. One of the exhaust valves 34 is disposed within each of the exhaust ports 38. The valve element 48 of each of the exhaust valve 34 is configured to close the respective exhaust port 38 when the exhaust valve 34 is in a closed position and block fluid flow relative to the cylinder 22. When the exhaust valve 34 is lifted from the closed position, the exhaust valve 34 allows a flow of fluid relative to the cylinder 22.

As also shown in FIG. 2, a valve actuation assembly 44 is operatively associated with the intake valves 32. The valve actuation assembly 44 may include a bridge 54 that is connected to each valve element 40 through a pair of valve stems 46. A spring 56 may be disposed around each of the valve stems 46 between the cylinder head 30 and the bridge 54. The spring 56 acts to bias both valve elements 40 into engagement with the respective valve seat 50 to thereby close each of the intake ports 36.

The valve actuation assembly 44 may include a rocker arm 64. The rocker arm 64 may be configured to pivot about a pivot 66. One end 68 of the rocker arm 64 may be connected to the bridge 54. An opposite end of the rocker arm 64 is connected to a cam assembly 52. In the exemplary aspect of FIG. 2, the cam assembly 52 includes a cam 60 having a cam lobe mounted on a cam shaft, a push rod 61, and a cam follower 62. One skilled in the art will recognize that the cam assembly 52 may have other configurations, such as, for example, where the cam 60 acts directly on the rocker arm 64 (e.g., overhead cam configuration).

The valve actuation assembly 44 may be driven by the cam 60. The cam 60 may be connected to the crankshaft 27 so that a rotation of the crankshaft 27 induces a corresponding rotation of the cam 60. The cam 60 may be connected to the crankshaft 27 through any means readily apparent to one skilled in the art, such as, for example, through a gear reduction assembly (not shown). As one skilled in the art will recognize, a rotation of the cam 60 will cause the cam follower 62 and the associated push rod 61 to periodically reciprocate between an upper and a lower position.

The reciprocating movement of the push rod 61 causes the rocker arm 64 to pivot about the pivot 66. When the push rod 61 moves in the direction indicated by the arrow 58, the rocker arm 64 will pivot and move the bridge 54 in the opposite direction. The movement of the bridge 54 causes each of the intake valves 32 to lift and open the associated intake ports 36. As the cam 60 continues to rotate, the springs 56 will act on the bridge 54 to return each intake valve 32 to the closed position.

In this manner, the shape and orientation of the cam 60 controls the timing of the actuation of the intake valves 32. As one skilled in the art will recognize, the cam 60 may be configured to coordinate the actuation of the intake valves 32 with the movement of the piston 24. For example, the intake valves 32 may be actuated to open the intake ports 36 when the piston 24 is withdrawing within the cylinder 22 to allow air to flow from the intake passageway 41 into the cylinder 22.

A similar valve actuation assembly may be connected to the exhaust valves 34. A second cam (not shown) may be connected to the crankshaft 27 to control the actuation timing of the exhaust valves 34. The exhaust valves 34 may be actuated to open the exhaust ports 38 when the piston 24 is advancing within the cylinder 22 to allow exhaust to flow from the cylinder 22 into the exhaust passageway 43.

As shown in FIG. 2, the valve actuation assembly 44 may include a fluid actuator 70. The fluid actuator 70 may include an actuator cylinder 72 that defines an actuator chamber 76. An actuator piston 74 may be slidably disposed within the actuator cylinder 72 and may be connected to an actuator rod 78. As an example, a bias device such as a return spring may act on the actuator piston 74 to return the actuator piston 74 to a home position. The actuator rod 78 is engageable with the end 68 of the rocker arm 64.

In an aspect, a fluid line 80 may be connected to the actuator chamber 76. Pressurized fluid may be directed through the fluid line 80 into the actuator chamber 76 to move the actuator piston 74 within the actuator cylinder 72. Movement of the actuator piston 74 causes the actuator rod 78 to engage the end 68 of the rocker arm 64. Fluid may be introduced to the actuator chamber 76 when the intake valves 32 are in the open position to move the actuator rod 78 into engagement with the rocker arm 64 to thereby hold the intake valves 32 in the open position. As an example, the fluid actuator 70, the fluid line 80, and/or other components of the system may be integrated with system components such as the rocker arm 64 in accordance other embodiments.

As illustrated in FIGS. 1 and 3, a source of fluid 84, which may connected to a tank 87, may be configured to supply pressurized fluid to the fluid actuator 70. The tank 87 may store any type of fluid readily apparent to one skilled in the art, such as, for example, hydraulic fluid, fuel, engine oil, or transmission fluid. The source of fluid 84 may be part of a lubrication system, such as typically accompanies an internal combustion engine. Such a lubrication system may provide pressurized oil having a pressure of, for example, less than 700 KPa (100 psi) or, more particularly, between about 210 KPa and 620 KPa (30 psi and 90 psi). Alternatively, the source of fluid may be a pump configured to provide oil at a higher pressure, such as, for example, between about 10 MPa and 35 MPa (1450 psi and 5000 psi).

In an aspect, a fluid supply system 79 may connect the source of fluid 84 with the fluid actuator 70. In the exemplary aspect of FIG. 3, the source of fluid 84 is connected to a fluid line 86 (e.g., fluid passageway), for example, via a fluid line. A control valve 82 is disposed in the fluid line 86. The control valve 82 may be a bi-directional control valve. The control valve 82 may be normally biased into a position and actuated to inhibit the flow of fluid through the control valve 82. One skilled in the art will recognize that control valve 82 may be any type of controllable valve, such as, for example a two coil latching valve. The control valve 82 may be opened to allow pressurized fluid to flow from the source of fluid 84 though the fluid line 86. The control valve 82 may be closed to prevent pressurized fluid from flowing from the source of fluid 84 through at least a portion of the fluid line 86.

As illustrated in FIG. 3, the fluid line 86 may be configured to supply pressurized fluid from the source of fluid 84 to one or more of the fluid actuators 70. In an aspect, each of the fluid actuators 70 may be associated with one or more of the intake valves 32 and the exhaust valves 34 of a particular engine cylinder 22 (referring to FIG. 1) or other valve system. As an example, one or more fluid lines 80 can be configured to direct pressurized fluid from the fluid line 86 into the actuator chamber 76 of each of the fluid actuators 70.

One skilled in the art will recognize that the fluid supply system 79 may have a variety of different configurations. In certain aspects, as illustrated in FIG. 3, the fluid supply system 79 may include a relief valve 90 disposed in fluid communication with the fluid line 86. As an example, the relief valve 90 may be or include a low pressure relief valve configured to be closed when pressure in the fluid line 86 is above a pre-defined pressure and open when the pressure in the fluid line 86 is below the pre-defined pressure (e.g., 0-100 kPa gauge pressure). Such a pre-defined pressure may be or include a crack pressure threshold established for the fluid supply system 79. One skilled in the art will understand that the crack pressure may be established for various systems based on the required operating parameters of the subject system. In certain aspects, when the relief valve 90 is closed, pressurized fluid may be caused to flow via the fluid line 86, for example, to the fluid actuators 70. When the relief valve 90 is open, a fluid remaining in the fluid line 86 may be allowed to drain via the relief valve 90 to an environment (e.g., external the fluid supply system 79) and may flush debris from the fluid supply system 79. As shown, the relief valve 90 may be fluidly disposed between the control valve 82 and the fluid actuators 70. The relief valve 90 may be disposed in fluid communication with the control valve 82 and one or more of the fluid actuators 70 in series.

Figure 4:
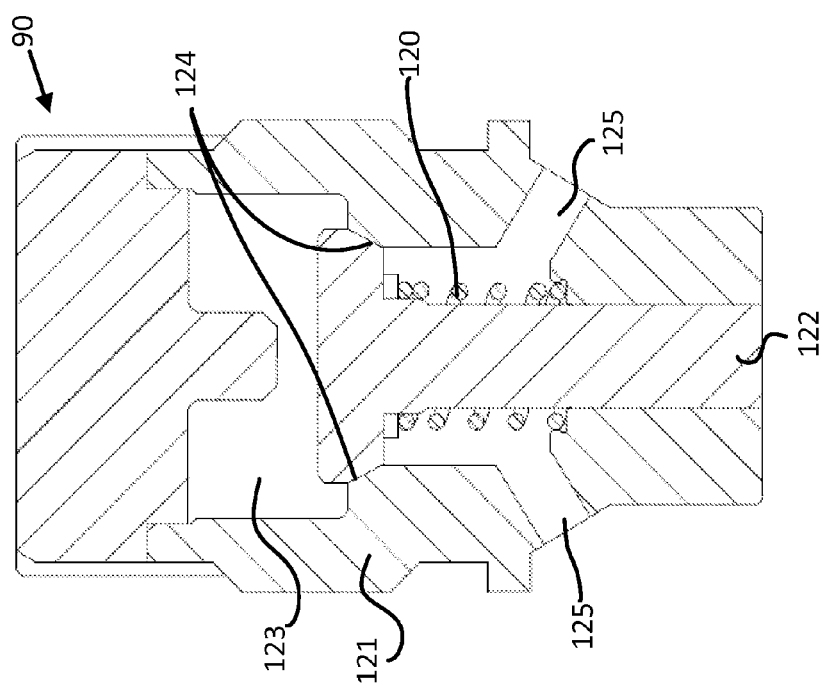
FIG. 4 is a cross-sectional view of an exemplary aspect of a relief valve for a fluid actuator in accordance with aspects of the disclosure.

As shown in FIG. 4, the relief valve 90 may be a poppet style valve. The relief valve 90 may include a housing 121 that defines an inlet passageway 123 and includes a seat 124. A poppet 122 is configured to sealingly engage the seat 124. A spring 120 acts on the poppet 122 to disengage the poppet 122 from the seat 124. The poppet 122 may be disengaged from the seat 124 to create a fluid passage between the inlet passageway 123 and one or more fluid outlets 125.

The relief valve 90 will close when the poppet 122 is exposed to a pressure differential that is sufficient to overcome the opening force of the spring 120. The poppet 122 will engage with the seat 124 when a force exerted by pressurized fluid in the inlet passageway 123 is greater than the combination of a force exerted by fluid in the fluid outlet 125 and the force of the spring 120. If, however, the combination of the force exerted by fluid in the fluid outlet 125 and the force of the spring 120 is greater than the force exerted by the pressurized fluid in the inlet passageway 123, the poppet 122 will disengage from the seat 124.

Returning to FIG. 3, a snubbing valve 98 (e.g., variable restrictor) may be disposed in fluid communication with the fluid line 80 leading to the actuator chamber 76. In certain aspects, the snubbing valve 98 may be integrated with the fluid actuator 70 (e.g., housed in the piston 74). The snubbing valve 98 may be configured to restrict the flow of fluid through the fluid line 80 or via the fluid actuator 70. For example, the snubbing valve 98 may be configured to decrease the rate at which fluid exits the actuator chamber 76 to thereby slow the rate at which the intake valve 32 closes. Such a configuration may be used to control valve seating velocities of various valves in various systems.

As shown in FIG. 3, the fluid supply system 79 may include an accumulator 95. The accumulator 95 may be disposed in fluid communication with the fluid line 86 and the fluid line 80. In certain aspects, the accumulator 95 is disposed between the control valve 82 and the fluid actuator 70. As an example, the accumulator 95 is fluidly disposed between the relief valve and the fluid actuators 70. As a further example, the control valve 82, the relief valve 90, the accumulator 95, and the fluid actuator 70 are disposed in series.

Figure 5:
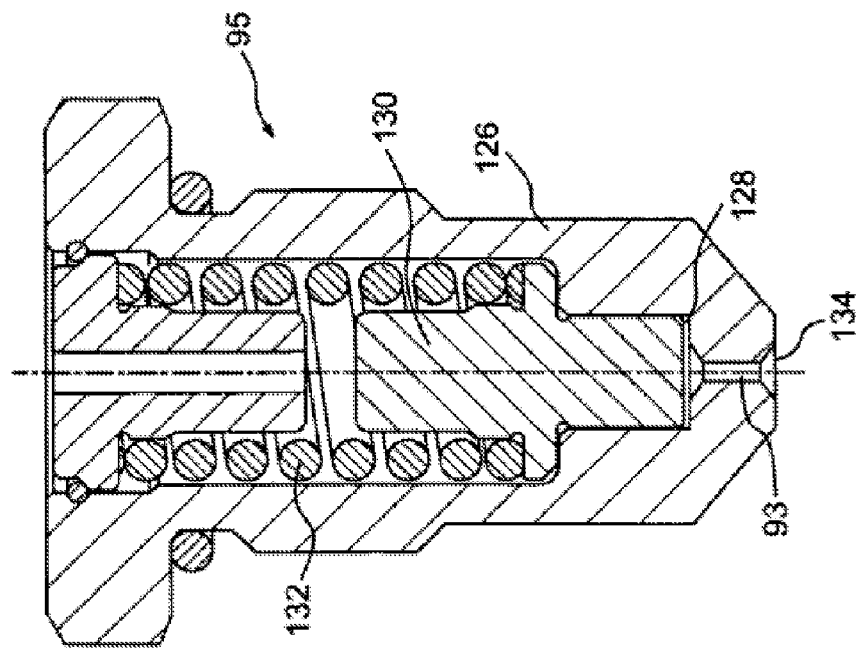
FIG. 5 is a cross-sectional view of an exemplary aspect of an accumulator for a fluid actuator in accordance with aspects of the disclosure.

An exemplary aspect of accumulator 95 is illustrated in FIG. 5. As shown, the accumulator 95 includes a housing 126 that defines a chamber 128. A piston 130 is slidably disposed in the chamber 128. A spring 132 is disposed in the housing 126 and acts on the piston 130 to move the piston 130 relative to the housing 126 to minimize the size of the chamber 128. One skilled in the art may recognize that other types of accumulators, such as for example, a bladder-type accumulator, may also be used.

Figure 7:
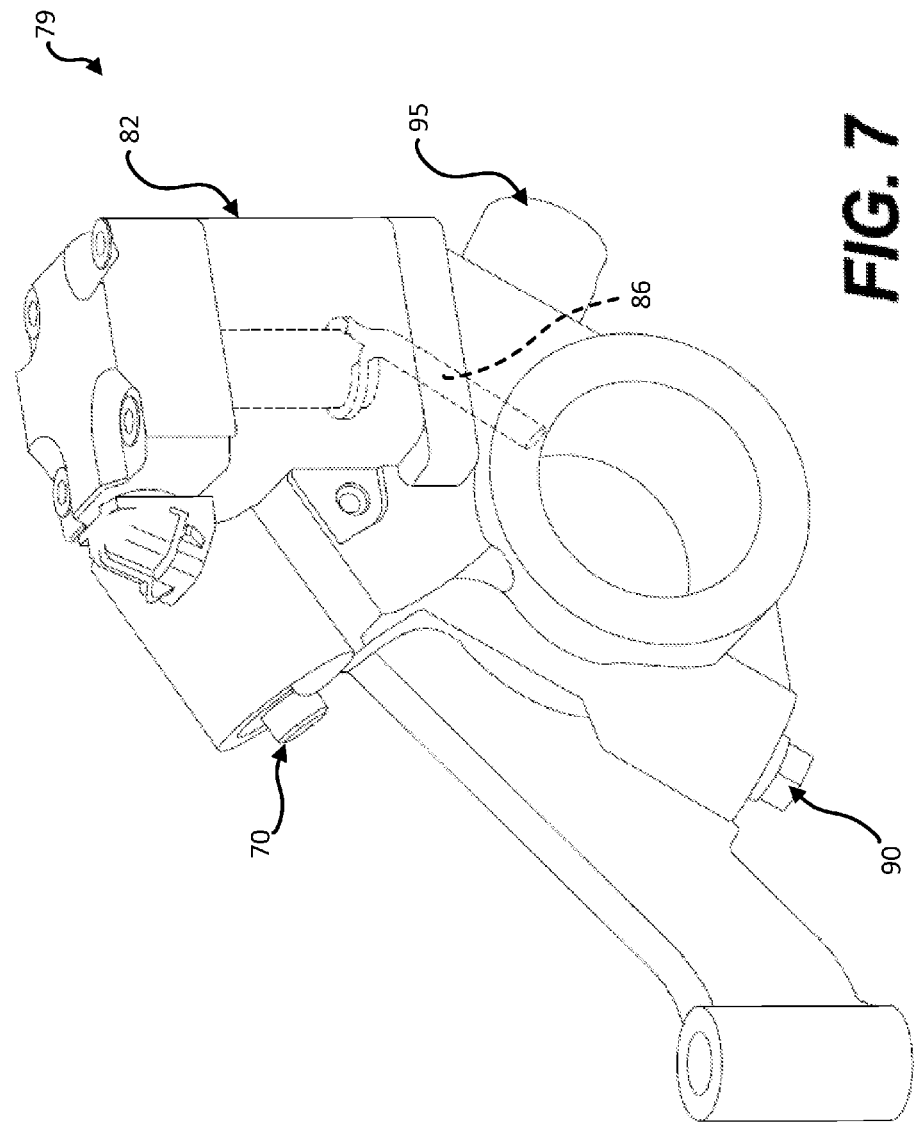
FIG. 7 is a perspective view of a fluid supply system in accordance with aspects of the disclosure and showing a high pressure circuit.

As also shown in FIGS. 3 and 7, a restrictive orifice 93 may be disposed in an inlet 134 to the accumulator 95. The restrictive orifice 93 may be configured to restrict the rate at which fluid may flow between the accumulator chamber 128 and the inlet 134. One or both of the accumulator 95 and the restrictive orifice 93 may act to dampen pressure oscillations in the actuator chamber 76 and the fluid line 80, which may cause the actuator piston 74 to oscillate.

Returning to FIG. 1, a controller 100 is connected to each of the valve actuation assembly 44 and to the control valve 82. The controller 100 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

The controller 100 may be programmed to control one or more aspects of the operation of the engine 20. For example, the controller 100 may be programmed to control the valve actuation assembly, the fuel injection system, and any other function readily apparent to one skilled in the art. The controller 100 may control the engine 20 based on the current operating conditions of the engine and/or instructions received from an operator.

The controller 100 may be further programmed to receive information from one or more sensors operatively connected with the engine 20. Each of the sensors may be configured to sense one or more operational parameters of the engine 20. For example, with reference to FIG. 3, one or more sensors 102 may be connected with the fluid supply system 79 to sense parameters such as the temperature of the fluid within the fluid supply system 79. One skilled in the art will recognize that many other types of sensors may be used in conjunction with or independently of the sensors 102. For example, the engine 20 may be equipped with sensors configured to sense one or more of the following: the temperature of the engine coolant, the temperature of the engine, the temperature of the engine oil, the ambient air temperature, the engine speed, the load on the engine, the intake air pressure and so on. The engine 20 may be further equipped with a sensor configured to monitor the crank angle of the crankshaft 27 to thereby determine the position of the pistons 24 within their respective cylinders 22. The crank angle of the crankshaft 27 is also related to actuation timing of the intake valves 32 and the exhaust valves 34.

INDUSTRIAL APPLICABILITY

Based on information provided by the engine sensors, the controller 100 may operate each valve actuation assembly 44 to selectively implement valve control such as a late intake Miller cycle for each cylinder 22 of the engine 20. Under normal operating conditions, implementation of the late intake Miller cycle will increase the overall efficiency of the engine 20. Under some operating conditions, such as, for example, when the engine 20 is cold, the controller 100 may operate the engine 20 on a conventional diesel cycle.

The following discussion describes the implementation of a late intake Miller cycle in a single cylinder 22 of the engine 20. One skilled in the art will recognize that the system of the disclosure may be used to selectively implement a late intake Miller cycle in all cylinders of the engine 20 in the same or a similar manner.

When the engine 20 is operating under normal operating conditions, the controller 100 implements a late intake Miller cycle by selectively actuating the fluid actuator 70 to hold the intake valve 32 open for a first portion of the compression stroke of the piston 24. This may be accomplished by allowing the control valve 82 to remain in the open position when the piston 24 starts an intake stroke. This allows pressurized fluid to flow from the source of fluid 84 through the fluid line 86 and into the actuator chamber 76 of the fluid actuator 70. As an example, the pressurized fluid may exceed a pre-defined pressure (e.g., crack pressure), which will cause the relief valve 90 to close and will create a high pressure circuit that directs the pressurized fluid to flow into the fluid actuator 70 via the fluid line 80. The term circuit may refer to a flow path and/or direction of the fluid. The force of the fluid entering the actuator chamber 76 moves the actuator piston 74 so that the actuator rod 78 follows the end 68 of the rocker arm 64 as the rocker arm 64 pivots to open the intake valves 32. The distance and rate of movement of the actuator rod 78 will depend upon the configuration of the actuator chamber 76 and the fluid supply system 79. When the actuator chamber 76 is filled with fluid and the rocker arm 64 returns the intake valves 32 from the open position to the closed position, the actuator rod 78 will engage the end 68 of the rocker arm 64.

Figure 8:
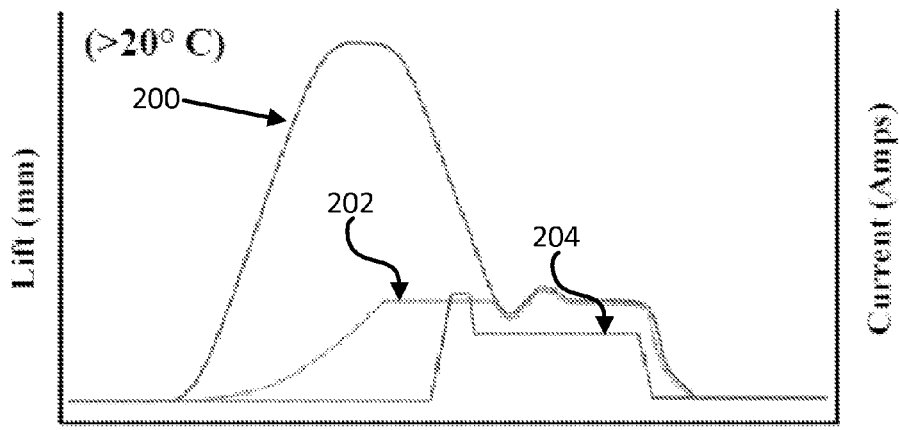
FIG. 8 is a graphical plot of lift versus time of an active condition in accordance with aspects of the disclosure.

In certain aspects, the fluid supply system 79 may be configured to supply a flow rate of fluid to the fluid actuator 70 to fill the actuator chamber 76 before the cam 60 returns the intake valves 32 to the closed position. As an example, when the actuator chamber 76 is filled with fluid, the controller 100 may close the control valve 82 to minimize an amount of fluid escaping from the actuator chamber 76. As the cam 60 continues to rotate and the springs 56 urge the intake valves 32 towards the closed position, the actuator rod 78 will engage the end 68 of the rocker arm 64 and prevent the intake valves 32 from closing. As long as the control valve 82 remains in the closed position, the trapped fluid in the actuator chamber 76 will prevent the springs 56 from returning the intake valves 32 to the closed position. Thus, the fluid actuator 70 will hold the intake valves 32 in the open position, independently of the action of the cam assembly 52. As an example, FIG. 8 illustrates a graphical representation of the normal operation (e.g., temperature above 20° C.) of an intake valve lift 200 (displacement of the intake valve 32) in relation to a piston lift 202 (displacement of the actuator piston 74) of the fluid actuator 70 and a current 204 applied to the control valve 82 to control actuation of the control valve 82.

When the actuator rod 78 engages the rocker arm 64 to prevent the intake valves 32 from closing, the force of the springs 56 acting through the rocker arm 64 may cause an increase in the pressure of the fluid within the fluid supply system 79. In response to the increased pressure, a flow of fluid will be throttled through the restrictive orifice 93 into the chamber 128 of the accumulator 95. The throttling of the fluid through the restrictive orifice 93 will dissipate energy from the fluid within the fluid supply system 79.

The force of the fluid entering the accumulator 95 will act to compress the spring 132 and move the piston 130 to increase the size of the chamber 128. When the pressure within the fluid supply system 79 decreases, the spring 132 will act on the piston 130 to force the fluid in the chamber 128 back through the restrictive orifice 93. The flow of fluid through the restrictive orifice 93 will also dissipate energy from the fluid supply system 79.

The restrictive orifice 93 and the accumulator 95 will therefore dissipate energy from the fluid supply system 79 as fluid flows into and out of the accumulator 95. In this manner, the restrictive orifice 93 and the accumulator 95 may absorb or reduce the impact of pressure fluctuations within the fluid supply system 79, such as may be caused by the impact of the rocker arm 64 on the actuator rod 78. By absorbing or reducing pressure fluctuations, the restrictive orifice 93 and the accumulator 95 may act to inhibit or minimize oscillations in the actuator rod 78.

Figure 6:
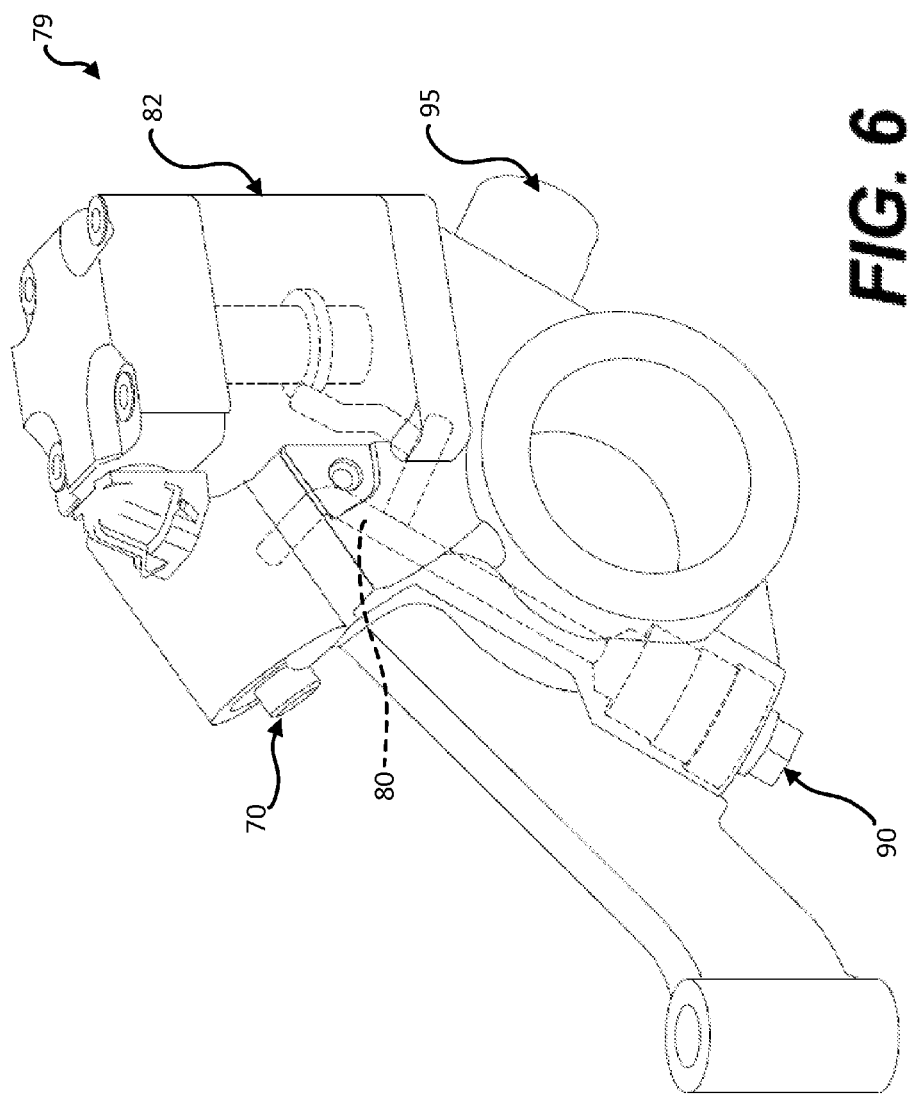
FIG. 6 is a perspective view of a fluid supply system in accordance with aspects of the disclosure and showing a low pressure circuit.

As an illustrative example, high pressure circuit is illustrated in FIG. 6.

In an aspect, controller 100 may allow the intake valves 32 to close by opening the control valve 82. This allows the pressurized fluid to flow out of the actuator chamber 76. The force of the springs 56 forces the fluid from the actuator chamber 76, thereby allowing the actuator piston 74 to move within the actuator cylinder 72. This allows the rocker arm 64 to pivot so that the intake valves 32 are moved to the closed position. The snubbing valve 98 may restrict the rate at which fluid exits the actuator chamber 76 to reduce the velocity at which the intake valves 32 are closed. This may prevent the valve elements 40 from being damaged when closing intake ports 36.

As the pressure in the fluid supply system 79 decrease below a pre-determined threshold (e.g., crack pressure) the relief valve 90 may open to create a low pressure circuit that allows fluid in the fluid line 86 to drain outside of the fluid supply system. As an illustrative example, FIG. 7 shows such a low pressure circuit, which allows fluid remaining in the fluid line to drain via the relief valve. Such drainage may remove debris from the fluid supply system 79.

As noted previously, certain operating conditions may require that the engine 20 be operated on a conventional diesel cycle instead of the late intake Miller cycle described above. These types of operating conditions may be experienced, for example, when the engine 20 is first starting or is otherwise operating under cold conditions. The described valve actuation system 44 allows for the selective disengagement of the late intake Miller cycle.

Figure 9:
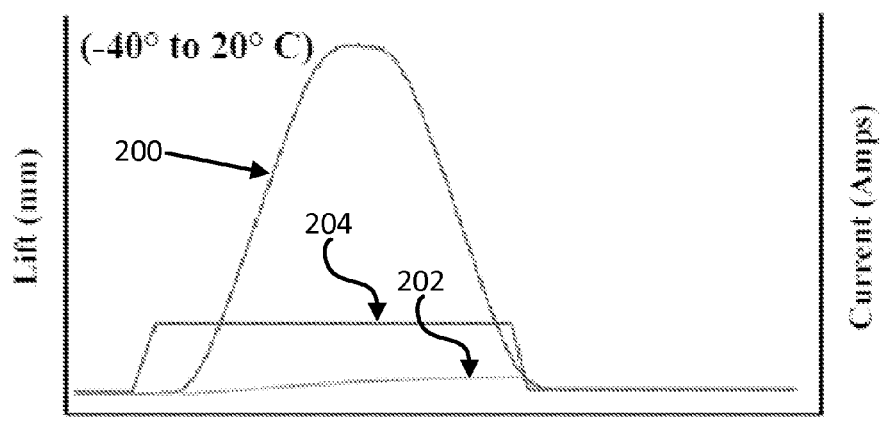
FIG. 9 is a graphical plot of lift versus time of an inactive condition in accordance with aspects of the disclosure.

Referring to FIGS. 1 and 3, the controller 100 may disengage the late intake Miller cycle by closing the control valve 82. The control valve 82 may be closed when the controller 100 receives sensory input indicating that the engine 20 is starting or is operating under cold conditions. Closing the control valve 82 prevents fluid from flowing from the source of fluid 84 into the actuator chamber 76. Without the introduction of fluid to the actuator chamber 76, the fluid actuator 70 will not prevent the intake valves 32 from returning to the closed position in response to the force of the springs 56. Thus, when the control valve 82 is closed, the intake valves 32 will follow a conventional diesel cycle as governed by the cam 60. As shown in FIG. 5, intake valve actuation 106 will follow a conventional closing 110. In the conventional closing 110, the closing of intake valves 32 substantially coincides with the end of the intake stroke of piston 24. When intake valves 32 close at the end of the intake stroke, no air will be forced from cylinder 22 during the compression stroke. This results in the piston 24 compressing the fuel and air mixture to a higher pressure, which will facilitate diesel fuel combustion. This is particularly beneficial when the engine 20 is operating in cold conditions. As an example, FIG. 9 illustrates a graphical representation of the inactive operation (e.g., cold start with temperature below 20° C.) of the intake valve lift 200 (displacement of the intake valve 32) in relation to the piston lift 202 (displacement of the actuator piston 74) of the fluid actuator 70 and the current 204 applied to the control valve 82 to control actuation of the control valve 82.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:
1. A valve actuation system, comprising:
a valve moveable between a first position to prevent a flow of fluid and a second position to allow a flow of fluid;
a cam assembly configured to move the valve between the first position and the second position, wherein the cam assembly is mechanically connected to the valve;
a fluid actuator configured to selectively prevent the valve from moving to the first position, and further configured to selectively hold the valve at a position between the first position and the second position;
a source of fluid in fluid communication with the fluid actuator;
a bi-directional control valve configured to control a flow of fluid between the source of fluid and the fluid actuator;
a fluid passageway connecting the bi-directional control valve with the fluid actuator;
an accumulator in fluid communication with the fluid passageway;
a restrictive orifice disposed between the accumulator and the fluid passageway to restrict a flow of fluid between the accumulator and the fluid passageway; and
a relief valve in fluid communication with the fluid passageway and moveable between a closed position to prevent a flow of fluid therethrough to create a high pressure circuit in the valve actuation system and an open position to allow a flow of fluid therethrough to create a low pressure circuit in the valve actuation system,
wherein the relief valve is actuated between the closed position and the open position based at least on a pressure in the fluid passageway,
wherein the high pressure circuit allows the fluid to pass through the fluid passageway to actuate the fluid actuator, and
wherein the low pressure circuit allows at least a portion of the fluid in the fluid passageway to drain from the fluid passageway to an external environment.

2. The valve actuation system of claim 1, further comprising a controller configured to actuate the bi-directional control valve between an open position and a closed position to control a flow of fluid between the source of fluid and the fluid actuator.

3. The valve actuation system of claim 1, wherein the bi-directional control valve is normally biased in an open position.

4. The valve actuation system of claim 1, wherein the relief valve includes a seat, a poppet, and a spring acting on the poppet to disengage the poppet from the seat.

5. The valve actuation system of claim 1, wherein the fluid actuator includes a piston operatively associated with the valve.

6. The valve actuation system of claim 1, further comprising a hydraulic snubbing valve configured to control the rate of fluid flow from the fluid actuator.

7. The valve actuation system of claim 1, wherein the accumulator includes a chamber, a piston moveable between a first position where the volume of the chamber is minimized and a second position where the volume of the chamber is maximized, and a spring acting on the piston to bias the piston towards the first position.

8. The valve actuation system of claim 1, wherein the bi-directional control valve, the relief valve, and the accumulator are fluidly connected to the fluid passageway in series.

9. A method of controlling an engine having a piston moveable through an intake stroke followed by a compression stroke, comprising:
- rotating a cam to move an intake valve between a first position to prevent a flow of fluid and a second position to allow a flow of fluid during the intake stroke of the piston, wherein the cam is mechanically connected to the intake valve;
- directing fluid through a bi-directional control valve and a fluid passageway to a fluid actuator associated with the intake valve after the intake valve is moved from the first position, wherein the fluid actuator is configured to selectively hold the intake valve at a position between the first position and the second position;
- actuating the bi-directional control valve to selectively prevent fluid from flowing through the fluid passageway from the fluid actuator to thereby prevent the intake valve from moving to the first position; and
- allowing a pressure in the fluid passageway to fall below a threshold pressure to allow a relief valve disposed in fluid communication with the fluid passageway to open and at least a portion of the fluid within the fluid passageway to drain to an external environment.

10. The method of claim 9, further comprising:
- sensing at least one operating parameter of the engine; and
- moving the bi-directional control valve to a closed position to prevent fluid from flowing to the fluid actuator based on the sensed operating parameter of the engine.

11. The method of claim 10, wherein the at least one operating parameter is at least one of a coolant temperature, an oil temperature, an engine temperature, an ambient air temperature, an engine speed, an engine load, and an intake air pressure.

12. The method of claim 9, further comprising closing the bi-directional control valve to prevent fluid from releasing from the fluid actuator to thereby prevent the intake valve from moving to the first position.

13. The method of claim 9, further comprising directing fluid from the fluid passageway through a restrictive orifice to an accumulator to inhibit oscillations in the fluid actuator.

14. An engine, comprising:
- an engine block defining at least one cylinder and a cylinder head having at least one intake passageway leading to the at least one cylinder;
- at least one intake valve moveable between a first position to prevent a flow of fluid through the at least one intake passageway and a second position to allow a flow of fluid through the at least one intake passageway;
- a cam assembly connected to the intake valve to move the intake valve between the first position and the second position, wherein the cam assembly is mechanically connected to the intake valve;
- a fluid actuator configured to selectively prevent the intake valve from moving to the first position, and further configured to selectively hold the intake valve at a position between the first position and the second position;
- a source of fluid in fluid communication with the fluid actuator;
- a bi-directional control valve configured to control a flow of fluid between the source of fluid and the fluid actuator;
- a fluid passageway connecting the directional control valve with the fluid actuator;
- an accumulator in fluid communication with the fluid passageway;
- a restrictive orifice disposed between the accumulator and the fluid passageway to restrict a flow of fluid between the accumulator and the fluid passageway;
- a relief valve in fluid communication with the fluid passageway and moveable between a closed position to prevent a flow of fluid therethrough and an open position to allow a flow of fluid therethrough,
- wherein the relief valve is actuated between the closed position and the open position based at least on a pressure in the fluid passageway,
- wherein the closed position of the relief valve allows the fluid to pass through the fluid passageway to actuate the fluid actuator, and
- wherein the open position of the relief valve allows at least a portion of the fluid in the fluid passageway to drain from the fluid passageway to an external environment.

15. The engine of claim 14, further comprising a controller configured to actuate the bi-directional control valve between an open position and a closed position to control a flow of fluid between the source of fluid and the fluid actuator.

16. The engine of claim 14, wherein the bi-directional control valve is normally biased in an open position.

17. The engine of claim 14, wherein the relief valve includes a seat, a poppet, and a spring acting on the poppet to disengage the poppet from the seat.

18. The engine of claim 14, wherein the fluid actuator includes a piston operatively associated with the valve.

19. The engine of claim 14, further comprising a hydraulic snubbing valve configured to control the rate of fluid flow from the fluid actuator.

20. The engine of claim 14, wherein the accumulator includes a chamber, a piston moveable between a first position where the volume of the chamber is minimized and a second position where the volume of the chamber is maximized, and a spring acting on the piston to bias the piston towards the first position.

* * * * *